United States Patent [19]

Varga et al.

[11] Patent Number: 5,013,998

[45] Date of Patent: May 7, 1991

[54] SYNTHESIS OF ZERO-IMPEDANCE CONVERTER

[76] Inventors: Ljubomir D. Varga, Deskaseva 6, 11000 Beograd, Yugoslavia; Novica A. Losic, 7802-23 Ave., Kenosha, Wis. 53140

[21] Appl. No.: 452,000

[22] Filed: Dec. 18, 1989

[51] Int. Cl.$^5$ .......................................... H02M 3/335
[52] U.S. Cl. .................................. 323/285; 323/286; 323/21; 318/811; 388/811
[58] Field of Search ........................... 363/16, 21, 97; 323/285, 286, 287; 318/808, 809, 810, 811; 388/811, 815, 819, 821, 822, 823, 824

[56] References Cited

U.S. PATENT DOCUMENTS 4,885,674 12/1989 Varga et al. .......................... 363/21

Primary Examiner—Steven L. Stephan
Assistant Examiner—Emanuel Todd Voeltz

[57] ABSTRACT

A method of synthesizing a system which forces finite value of an impedance to zero comprising positive current feedback of exactly specified nature and value of its transfer function. The stability and dynamics of the system are controlled by additional voltage loop. The zero-impedance converter is used to synthesize load-independent systems including switch-mode power converters and pulse width modulated electric motor drive systems incorporating any kind of motor.

7 Claims, 2 Drawing Sheets

SYNTHESIS OF ZERO-IMPEDANCE CONVERTER

FIELD OF THE INVENTION

This invention relates to circuits and systems and more particularly to power converters and electric motor drives using a zero-impedance converter to control an output variable of interest, the output voltage in case of power converters and the output angular position/velocity in case of electric motor drives, when load changes by making the system independent of load.

BACKGROUND OF THE INVENTION

In the circuit and system theory as well as in the practice it is of interest to minimize the output impedance of power converters of a voltage-source type in both steady state and transient. See, for example, K. K. Sum, "Switch Mode Power Conversion", Marcel Dekker, Inc., 1984, pp.196–200, P. R. K. Chetty, "Switch-Mode Power Supply Design". TAB Books, Inc., 1986, pp.84–87, K. Billings, "Switchmode Power Supply Handbook", McGraw-Hill, 1989, pp.3.228, and PCIM magazine, October 1989, pp.29.

Furthermore, in order to achieve mathematically complete, and thus ideal, load-independent operation, it can be shown that in a system of interest an impedance of interest should be forced to zero whereby this statement applies to both power converters and electric motor drives employing any kind of motor including dc, synchronous and asynchronous ac, and step motors.

All known techniques produce less or more successful minimization of the impedance of interest, usually in proportion to their complexity, in an attempt to optimize the solution to this problem. One such optimization is given in the article by R. Redl and N. O. Sokal, "Near-Optimum Dynamic Regulation of DC-DC Converters Using Feed-Forward of Output Current and Input Voltage With Current-Mode Control", IEEE Transactions on Power Electronics, VOL.PE-1, No.3, July 1986, pp.181–192, but is not, as such, applicable to, for example, drives.

None of the presently known techniques produces a zero impedance.

A particular and specific applications of a zero-impedance converter are described in the U.S. Pat. No. 4,885,674, December 1989, entitled "Synthesis of Load-Independent Switch-Mode Power Converters" by these same two inventors L. J. D. J. Varga and N. A. Losic as well as in the two copending and coassigned applications of N. A. Losic and L. J. D. J. Varga, entitled "Synthesis of Load-Independent DC Drive System", patent application Ser. No. 07/323,630, November 1988, and "Synthesis of Load-Independent AC Drive systems", patent application Ser. No. 07/316,664, February 1989.

SUMMARY OF THE INVENTION

It is therefore an object of the present invention to provide a generalized synthesis method to produce a zero-impedance converter to achieve complete load independence in both power converters and electric motor drive systems with any kind of electric motor including dc, synchronous and asynchronous ac, and step motors. These applications are by no means exclusive; the zero-impedance converter can be used in any application which can make use of its properties.

Briefly, for use with a power converter or an electric motor drive system, the preferred embodiment of the present invention includes a positive current feedback loop within a negative voltage feedback loop, the transfer function of a circuit in the current loop, H(s), synthesized such that its numerator is equal to the impedance of interest, $Z'_{ekv}(s)$ or $Z_{ekv}(s)$, and its denominator is equal to a transresistance of the current feedback loop, RAK, whereas the current sensed is the current through the impedance of interest, $Z'_{ekv}(s)$ or $Z_{ekv}(s)$.

The transfer function of the current feedback circuit, as the algorithm of this novel method, therefore is $$H(s) = Z'_{ekv}(s)/RAK \quad (1)$$

or $$H(s) = Z_{ekv}(s)/RAK \quad (2)$$

where Eq.(1) applies in case of power converters and Eq.(2) applies in case of electric motor drive systems.

In Eq.(1), $Z'_{ekv}(s)$ denotes the impedance of an output filter inductor.

In Eq.(2), $Z_{ekv}(s)$ denotes the impedance of an electric motor.

In Eqs.(1) and (2), R is transresistance of a current sense device, A is voltage gain of a PWM control and power stage, and K is gain constant of a buffering amplifier in the current loop.

The ability to force the value of an impedance to zero is a material advantage of the present invention. The converter forces the impedance of interest to zero, with associated finite and instantaneous current change through and zero voltage change across an inductive impedance. Alternatively, the converter provides for finite and instantaneous voltage change across and zero current change through a capacitive impedance. In applying the zero-impedance converter to synthesizing load independent power converters and electric motor drives, the impedance of interest, $Z'_{ekv}(s)$ or $Z_{ekv}(s)$, is of inductive nature.

Other advantages of the present invention include its ability to be realized in an integrated-circuit (IC) form; the provision of such a method which simplifies design of negative voltage feedback loop for optimum system performance; and the provision of such a method which provides zero output-variable-of-interest-change-to-load-change transfer function in both transient and steady state.

As indicated by Eqs.(1) and (2), the circuit realization of the block in the positive current feedback loop is a direct and explicit function of the impedance of interest, $Z'_{ekv}(s)$ or $Z_{ekv}(s)$.

As it will be shown in the detailed description section, the zero-impedance converter operates in its own, local, domain without being concerned with other control algorithms used in controlling the system, or with the actual internal working mechanisms in case of an electric motor drive such as producing the torque or generating the back electromotive force; these mechanisms being shown in equivalent circuit of a machine. The zero-impedance converter, as shown in the algorithm in Eqs.(1) and (2), operates independently of an equivalent circuit of the system of interest; it uses information only about an equivalent impedance of the system of interest. For example, the algorithm of Eq.(2) is independent on a system moment of inertia, and therefore on the mass, as well a on a viscous friction coefficient, implying infinite robustness of a drive system with respect to these mechanical parameters, of course, within physical limitations of the system. This implies a possibility of significant simplification in controlling a high-performance electric motor drive systems by simplifying the control algorithm used and, at the same time, achieving ultimate load independent operation not previously attained.

These and other objects and advantages of the present invention will no doubt be obvious to those skilled in the art after having read the following detailed description of the preferred embodiment which is illustrated in the FIGURES of the drawing.

DETAILED DESCRIPTION

Figure 1:
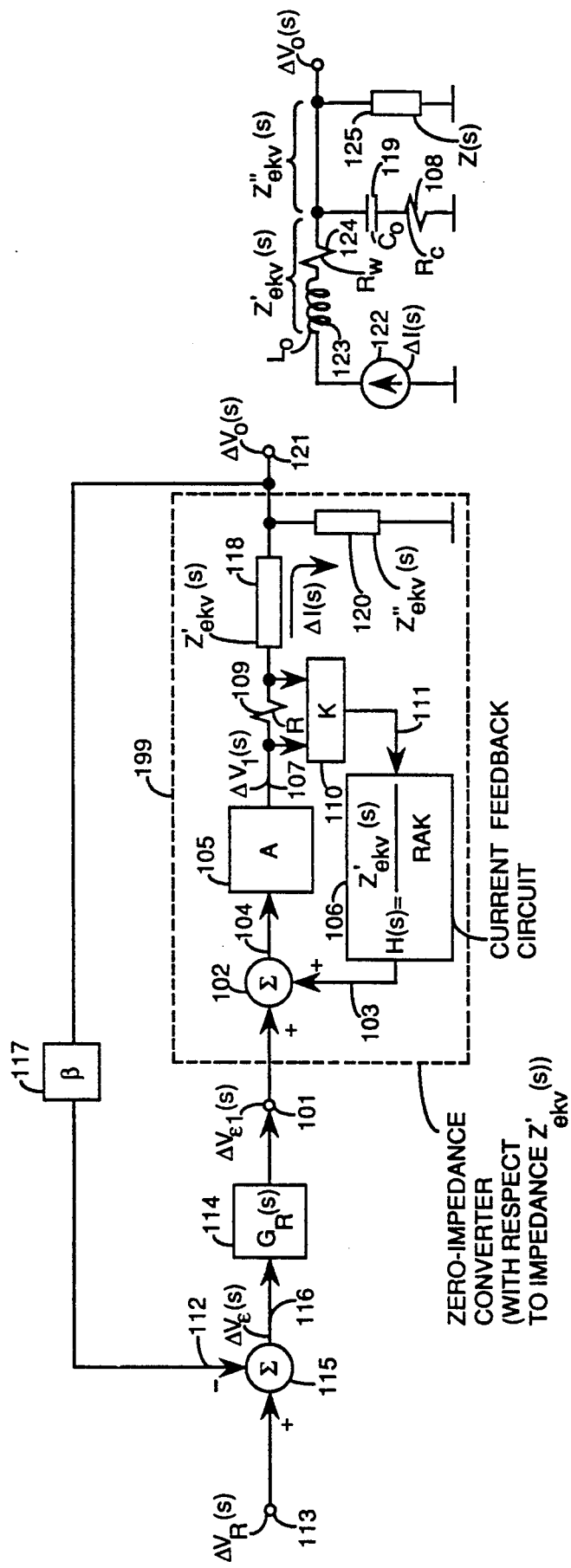
FIG. 1 is a block and schematic diagram of a first embodiment of the invention.

A zero-impedance converter embodying the principles of the invention applied to synthesizing a load independent power converters is shown in FIG. 1. In FIG. 1, it is assumed that input voltage $V_{in}$ (not illustrated) applied to the power stage 105 is constant, or that its variation is compensated by a feedforward technique which is well known in the art and will not be elaborated here except to say that it is based on adjusting a slope of a rising edge of a sawtooth waveform, inherent in a pulse width modulation (PWM stage 105, in proportion to the input voltage $V_{in}$. Then a gain constant A characterizes transfer function of the PWM control and power stage 105. Thus, a signal applied to lead 104 is voltage-amplified A times to appear as voltage $\Delta V_1(s)$ on lead 107 with an associated power/current $\Delta I(s)$ supplied by the input voltage source $V_{in}$.

In FIG. 1, portion enclosed as indicated and referred to with numeral 199 denotes zero-impedance converter; the remaining portion illustrates a remaining implementation of the zero-impedance converter in applying it in synthesizing a load invariant power converter.

The zero-impedance converter 199 employs a positive current feedback loop. A negative voltage feedback loop is also closed around the zero-impedance converter. The positive current feedback loop incorporates current feedback circuit 106 which is characterized by transfer function H(s). Either analog or microprocessor realization of the current feedback circuit 106 may be done. The negative voltage feedback loop may incorporate voltage sampling network 117 which is a resistive network whose transfer function is $\beta$. The purpose of the positive current feedback loop is to synthesize the zero-impedance converter with respect to impedance 118 whose value $Z'_{ekv}(s)$ is forced to zero for the transfer function H(s) synthesized as given in Eq.(1) and shown in FIG. 1, as it will be explained shortly. The purpose of the negative voltage feedback loop is to stabilize the system and control its dynamics by means of a stabilizing network 114 whose transfer function is $G_R(s)$.

In operation, the current through the output filter inductor 118 whose impedance is $Z'_{ekv}(s)$ is sensed by current sense device 109 whose trans-resistance is R. The output filter consists of inductor 118 of inductance 123 whose value is $L_o$ and resistance 124 whose value is $R_w$, and capacitor of capacitance 119 whose value is $C_o$ and equivalent series resistance 108 whose value is $R_c$. The load complex Z(s) is connected in parallel with the output filter capacitor and this parallel connection 120 is of value $Z''_{ekv}(s)$. The output filter inductor current $\Delta I(s)$ supplies the parallel connection 120 which, in a portion of FIG. 1, is symbolically represented by the source 122 which, providing the current $\Delta I(s)$ through the output filter inductor of impedance $Z'_{ekv}(s)$ to the parallel connection 120 of impedance $Z''_{ekv}(s)$, produces the output voltage $\Delta V_o(s)$ at the output node 121. For $R << |Z'_{ekv}(s)|$ the output filter inductor current value is $\Delta I(s)=[\Delta V_1(s)-\Delta V_o(s)]/Z'_{ekv}(s)$. The voltage representative of the output filter inductor current $R\Delta I(s)$ is buffered by a differential amplifier 110 whose gain constant is K. The output of the isolating/buferring amplifier 110 is connected by means of lead 111 to current feedback circuit 106 whose transfer function is H(s). The current sense signal obtained and processed in this manner is then added in the positive feedback manner by means of lead 103 to a voltage loop processed error signal $\Delta V_{e1}(s)$ in a summing circuit 102. The voltage loop processed error signal $\Delta V_{e1}(s)$ is provided at point 101 as an output from the stabilizing network 114 which is fed via lead 116 by a voltage loop error signal $\Delta V_e(s)$ The voltage loop error signal $\Delta V_e(s)$ is obtained at the output of a summing circuit 115 in which the negative feedback via lead 112 is closed with respect to a reference voltage $\Delta V_R(s)$ applied to terminal 113.

The resulting control voltage, obtained by summing in the positive feedback manner the current sense signal processed by the current feedback circuit 106 and the voltage loop processed error signal $\Delta V_{e1}(s)$, is applied by lead 104 to PWM control and power stage 105 which produces controlled but unfiltered voltage $\Delta V_1(s)$ at lead 107. The lowpass filtering of voltage $\Delta V_1(s)$ is done in the output filter described above which yields the output voltage $\Delta V_o(s)$ at terminal 121. From FIG. 1

$$Z'_{ekv}(s)=R_w+sL_o \qquad (3)$$

$$Z''_{ekv}(s)=[R_c+(1/sC_o)]||Z(s) \qquad (4)$$

where symbol || denotes a parallel connection 120.

The transadmittance of the zero-impedance converter of FIG. 1, Y(s), is, for $R<<|Z'_{ekv}(s)|$ $$\Delta I(s)/\Delta V_{e1}(s)=Y(s)=A/[Z'_{ekv}(s)+Z''_{ekv}(s)-H(s)\cdot RAK] \qquad (5)$$

The transfer function of the zero-impedance converter of FIG. 1 is, for $R<<|Z'_{ekv}(s)|$ $$\Delta V_o(s)/\Delta V_{e1}(s) = A/\{[1 + sC_o(sL_o + R_w)/(1 + sC_oR_c)] - [H(s)RAKsC_o/(1 + sC_oR_c)] + [[(sL_o + R_w) - H(s)RAK]/Z(s)]\} \qquad (6)$$

The third term in denominator of Eq.(6) is dependent on complex load impedance Z(s). Using Eqs.(3) and (5), the nominator of this third term becomes $$Z'_{ekv}(s)-H(s)RAK=[A/Y(s)]-Z''_{ekv}(s) \qquad (7)$$

where both sides of Eq.(7) are to be divided by Z(s) so that Eq.(7) would present the load dependent term of Eq.(6). For load invariance, the nominator of the load dependent term, given in Eq.(7), should be zero which is achieved for $$Y(s)=A/Z''_{ekv}(s) \qquad (8)$$

or $$H(s) = Z''_{ekv}(s)/RAK \qquad (9)$$

Eq.(9) is the condition for load invariance and has been shown in the summary of the invention as Eq.(1). It yields for the transadmittance of the zero-impedance converter, Y(s), the expression given in Eq.(8). It also yields, upon substitution of Eq.(9) in Eq.(6), for the transfer function of the zero-impedance converter $$\Delta V_o(s)/\Delta V_{e1}(s) = A \qquad (10)$$

With reference to FIG. 1, Eqs.(8) and (10) imply that the impedance $Z'_{ekv}(s)$ of the output filter inductor 118 has been forced to zero in that the circuit effects due to the pressence of the impedance $Z'_{ekv}(s)$ have been nulled out by the action of the positive current feedback loop. In this action, the positive current feedback provided a negative impedance term, $-H(s)RAK$, which cancelled out the output filter inductor impedance $Z'_{ekv}(s)$ so that, in a strict sense of the word, the zero-impedance converter in its actuality is a zero-transimpedance converter where the transimpedance given in Eq.(7) is brought to zero.

Eq.(10) also implies that, in addition to the load independence, the zero-impedance converter provides as well an independence to the variations of the parameters of the output filter capacitor $C_o$ and $R_c$. From the expression for the transadmittance of the zero-impedance converter in Eq.(8) and from the definition of the transadmittance in Eq.(5)

$$\Delta I(s) = \Delta V_{e1}(s) A / Z''_{ekv}(s) \qquad (11)$$

Combining Eqs.(10) and (11)

$$\Delta I(s) = \Delta V_o(s) Z''_{ekv}(s) \qquad (12)$$

which could have been directly obtained from the inspection of FIG. 1.

The meaning of Eq.(12) is in that the output voltage is constant for any change of the impedance $Z''_{ekv}(s)$ because the current, involved as a third variable in Eq.(12), is able to change appropriately to keep the product $\Delta I(s) Z''_{ekv}(s)$ constant in both transient and steady state. The impedance $Z''_{ekv}(s)$, as seen from Eq.(4) and FIG. 1, changes when either load impedance Z(s) or capacitor impedance $[R_c + (1/sC_o)]$ changes. For any of those changes, the current through the inductor impedance $Z'_{ekv}(s)$ changes appropriately which is possible because the impedance $Z'_{ekv}(s)$ has been effectively reduced to zero for the algorithm given in Eq.(9) and illustrated in FIG. 1. By reducing the resistive part of the output filter inductor to zero the steady state error in the output voltage, when the impedance $Z''_{ekv}(s)$ changes, is zero. By reducing the inductive part of the output filter inductor to zero the transient error in the output voltage is again zero. The effects described are rather circuit effects. Physically, what the zero-impedance converter does is cancelling the voltage drop across the output filter inductor 118 in both transient and steady state when impedance 120 changes which provides for the constant output voltage at terminal 121. By forcing the output filter inductor impedance $Z'_{ekv}(s)$ to zero, from the impedance's circuit terminal properties view, the zero-impedance converter provides for instantaneously supplied current as per load demand which, effectively, is providing an instantaneous current change through an inductance limited only by the physical properties of a physical system such as finite energy level of available sources, finite power dissipation capability of available components and finite speed of transition of control signals.

Since the transfer function of the zero-impedance converter of FIG. 1 becomes constant A, as shown in Eq.(10), it is seen that the stability and dynamics of the system of FIG. 1 is fixed by the block 114 whose transfer function is $G_R(s)$ the design of which can be greatly simplified as compared to the conventional system design. The stability is ensured by appropriate gain/phase margins of a loop gain $LG(s) = \beta A G_R(s)$ for the system in FIG. 1. Since the power converters are in general a regulator-type control systems, i.e., systems whose reference input does not change, it follows that by eliminating the load dependency using the zero-impedance converter and by eliminating dependence on input (line) voltage variations by using, for example, a feedforward compensation as assumed in FIG. 1, the design of the negative voltage feedback loop can be greatly simplified.

In the system of FIG. 1, the current through the output filter inductor 118 was sensed. This enabled, due to the algorithm illustrated in FIG. 1, complete independence on both load and output filter capacitor impedance changes. In the U.S. Pat. No. 4,885,674, December 1989, by these two same inventors, it is shown that sensing the current through the complex load impedance Z(s) and employing the same algorithm for transfer function of the current feedback circuit in a positive current feedback loop, as given in Eq.(9), the complete load independence can again be achieved. However, in such a case, the transfer function of the zero-impedance converter, given by Eq.(6) for the zero-impedance converter of FIG. 1, becomes $$\Delta V_o(s)/\Delta V_{e1}(s) = A/\{[1 + sC_o(sL_o + R_w)/(1 + sC_oR_c)] + [[(sL_o + R_w) - H(s)RAK]/Z(s)]\} \qquad (13)$$

Upon the substitution of the algorithm given in Eq.(9) into Eq.(13) the transfer function of the zero-impedance converter in case of sensing a current through the complex load impedance Z(s), becomes $$\Delta V_o(s)/\Delta V_{e1}(s) = A/\{1 + sC_o(sL_o + R_w)/(1 + sC_oR_c)\} \qquad (14)$$

so that the stabilizing network 114 of transfer function $G_R(s)$ should be designed appropriately to compensate for the system dependence on parameters of output filter components as shown in Eq.(14). However, this is usually of less importance once the load independence and input voltage independence have been achieved. Nevertheless, the zero-impedance converter in the preferred embodiment in FIG. 1, provides for further improvement in synthesizing a load independent switch mode power converters as its transfer function, given in Eq.(10), becomes a constant A independent on parameters of output filter components, so that an ultimate simplification of design of the stabilizing network 114 is provided.

A sensitivity analysis in connection with the algorithm of the synthesis of zero-impedance converter, given in Eq.(9), has been performed showing quite acceptable figures in terms of how the changes of the parameters involved in the algorithm of Eq.(9) affect the performance of the zero-impedance converter. In connection with the sensitivity analysis, it can be shown that a change in the impedance of interest or, equivalently, a change in the transfer function in the algorithm of this invention, given by Eq.(9), such that impedance $Z'_{ekv}(s)$ becomes $Z'_{ekv}(s) + \Delta Z'_{ekv}(s)$, or the nominator of the transfer function of Eq.(9) $Z'_{ekv}(s)$ becomes $Z'_{ekv}(s) + \Delta Z'_{ekv}(s)$, would result in changed transadmittance of the zero-impedance converter so that Eq.(8) would become $\Delta I(s)/\Delta V_{\epsilon 1}(s) = A/[Z''_{ekv}(s) + + \Delta Z'_{ekv}(s)]$ or $\Delta I(s)/\Delta V_{\epsilon 1}(s) = -A/[Z''_{ekv}(s) + \Delta Z'_{ekv}(s)]$, respectively.

As indicated by Eqs.(9) and (3), the circuit realization of the block 106 in the positive current feedback loop reduces to implementing a differentiator circuit with a dc path wherein these two signal processing paths are exactly determined with Eqs.(9) and (3).

Figure 2:
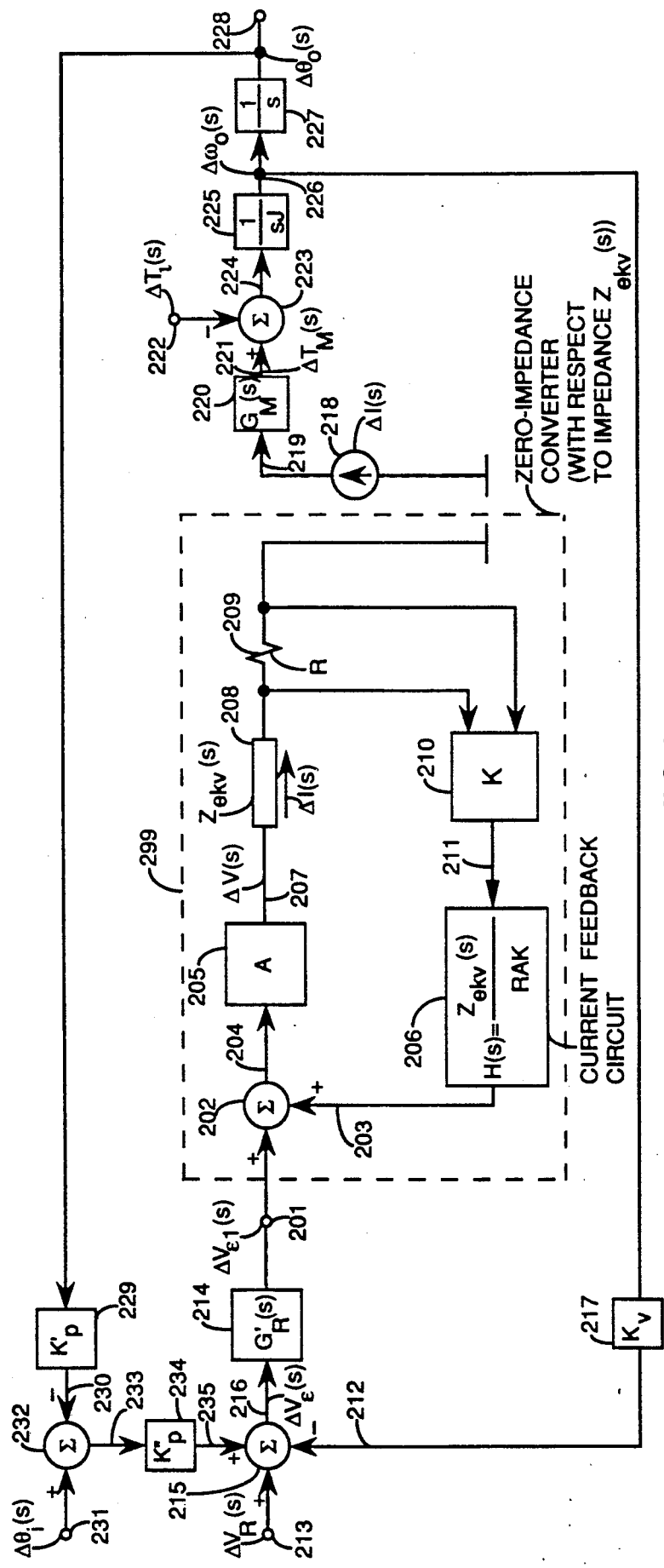
FIG. 2 is a block and schematic diagram of another embodiment of the invention.

Another embodiment of the invention applied to synthesizing a load independent electric motor drive systems with any kind of electric motor including dc, synchronous and asynchronous ac, and step motors, is shown in FIG. 2. In FIG. 2, it is assumed that input voltage $V_{in}$ (not illustrated) applied to power stage 205 is constant so that gain constant A characterizes transfer function of the pulse width modulation (PWM) control and power stage 205. The power stage within block 205 is implemented appropriately for the kind of a motor which it powers, for example it may be a dc-to-dc converter for dc motors or dc-to-ac converter for ac motors or a PWM power stage employed for driving step motors. The PWM control portion within block 205 then performs appropriate control function. What is of interest here is that the overall voltage gain of the control and power PWM stage is constant A. Thus, a signal applied to lead 204 is voltage-amplified A times to appear as voltage $\Delta V(s)$ on lead 207 with an associated power/current $\Delta I(s)$ supplied by the input voltage source $V_{in}$.

In FIG. 2, portion enclosed as indicated and referred to with numeral 299 denotes zero-impedance converter; the remaining portion illustrates a remaining implementation of the zero-impedance converter in applying it in synthesizing a load invariant electric motor drive systems.

The zero-impedance converter 299 employs a positive current feedback loop. A negative velocity and position feedback loops are closed around the zero-impedance converter. The positive current feedback loop incorporates current feedback circuit 206 whose transfer function is H(s). Either analog or microprocessor realization of the current feedback circuit 206 may be done. The negative velocity feedback loop incorporates an angular velocity sensing device, e.g. tach, 217, characterized by a gain constant $K_v$. The negative position feedback loop incorporates an angular position sensing device, e.g. encoder, 229, characterized by a gain constant $K'_p$. The purpose of the positive current feedback loop is to synthesize the zero-impedance converter with respect to impedance 208 whose value $Z_{ekv}(s)$ is forced to zero for the transfer function H(s) synthesized as given in Eq.(2) and shown in FIG. 2, as it will be explained shortly. The purpose of negative velocity and position feedback loops is to stabilize the system and control its dynamics by means of a stabilizing and a control block which are represented by a single block 214 of transfer function $G'_R(s)$.

In operation, the current $\Delta I(s)$ through an electric motor impedance 208 of value $Z_{ekv}(s)$ is sensed by current sense device 209 whose transresistance is R. The electric motor impedance 208 is a series connection of a resistance and an inductance in case of dc, synchronous ac, and step motors. In case of asynchronous ac motor (induction motor) this impedance consists of a series connection of a stator impedance and an impedance obtained as a parallel connection of a magnetizing reactance and a rotor impedance referred to stator. The current $\Delta I(s)$ provides a motor developed torque $\Delta T_M(s)$ which, in a portion of FIG. 2, is symbolically represented by the source 218 which, providing the current $\Delta I(s)$ on lead 219 as an input to a block 220 of transfer function $G_M(s)$ denoting a torque-producing mechanisms in any electric motor, generates motor torque $\Delta T_M(s)$ on lead 221. In case of n-phase motors, a total current $\Delta I(s)$ is understood to be sourced by the source 218, and the zero-impedance converter 299 is assumed to be per-phase based. It is also understood that a signals on leads 204, 203, and 201 are compatible in that they are: a dc varying signals in case of a dc motor; a sinusoidal signals of the same frequency in case of an ac motor; and a pulse signals of the same rate in case of a step motor (which produces an angular shaft speed $\Delta \omega_o(s)$ proportional to this rate of pulses). Thus, for a dc varying signal $\Delta V_\epsilon(s)$ available on lead 216, a control portion of the block 214 produces a control signal $\Delta V_{\epsilon 1}(s)$ at the input 201 of the zero-impedance converter 299, the signal $\Delta V_{\epsilon 1}(s)$ being of the form appropriate for a motor controlled as described above. In the same manner, the current sense signal processed through a current feedback circuit 206 and available on lead 203 is of the form appropriate for a motor controlled, as described. The Laplace-transformed function $G_M(s)$ is used to denote the torque producing mechanisms of any electric motor even though in some motors the torque production is a nonlinear process, the justification for this linearization being in that the function $G_M(s)$ will not play any role in the functioning of the algorithm that will be shortly derived for the zero-impedance converter 299. The motor developed torque $\Delta T_M(s)$, available on lead 221, is opposed by a load torque $\Delta T_L(s)$, supplied externally at point 222. This opposition takes place in an algebraic summer 223. The difference between the two torques, i.e., $\Delta T_M(s) - \Delta T_L(s)$, is supplied by lead 224 to a block 225 which denotes transformation from a torque to an angular shaft speed, and whose transfer function is 1/sJ, where J is a system moment of inertia. Normally, this block, 225, has a transfer function 1/(sJ+B) where B is a viscous friction coefficient, but it is easily shown that the algorithm of the zero-impedance converter 299, that will be shortly derived, is independent on the viscous friction coefficient as well as it will be shown that it is also independent on the system moment of inertia implying infinite robustness of the system employing the zero-impedance converter with respect to these mechanical parameters. In addition to being independent on mechanical parameters J and B, and on the mechanisms of producing a torque in a machine, $G_M(s)$, it will also be shown that the algorithm of the zero-impedance converter 299 will be independent on transfer function $G'_R(s)$, characterizing block 214, which denotes a stabilizing and a control block. In the same manner it can be also shown that the algorithm of the zero-impedance converter 299 is independent of a mechanisms of producing a back electromotive force in an electric motor. For that reason these mechanisms, usually represented by a negative feedback opposing voltage supplied to a motor terminals in proportion to the motor angular speed, have not been incorporated in FIG. 2. An angular shaft speed $\Delta\omega_o(s)$ is produced at point 226 while an angular shaft position $\Delta\theta_o(s)$, obtained by integration of the speed in block 227, is available at point 228. A velocity feedback signal is provided on lead 212, as an output of the velocity sensing device 217, to close a negative velocity feedback loop, in an algebraic summer 215, with respect to a velocity reference voltage $\Delta V_R(s)$ supplied on terminal 213, and with respect to a position error signal provided by lead 235. The position error signal is provided at the output of D/A converter 234 whose gain constant is $K''_p$ in Volts/pulses. A digital representation of the position error signal is supplied by a lead 233 to the D/A converter 234 as a result of a comparison of phase and frequency of a position command pulses and position feedback pulses. The position command pulses, denoted $\Delta\theta_i(s)$, are provided at point 231 while the position feedback pulses are provided by lead 230 as an output of an encoder 229 whose gain constant is $K'_p$. A negative position feedback loop is closed in an algebraic summer 232 wherein the position feedback pulses are fed back in a negative feedback manner with respect to the position command pulses. The algebraic summer 232 is implemented as phase/frequency detector which produces at its output 233 a digital number proportional to the difference in phase and frequency between the position command and feedback pulses. The output of the algebraic summer 215 thus supplies on lead 216 an algebraic sum of velocity error signal and position error signal, $\Delta V_e(s)$, which is processed by a stabilizing and control block 214 of transfer function $G'_R(s)$ providing a control signal $\Delta V_{\epsilon 1}(s)$ at the input terminal 201 of the zero-impedance converter 299.

The voltage representative of a motor current, $R\Delta I(s)$, is buffered by a differential amplifier 210 whose gain constant is K. The output of the isolating/buffering amplifier 210 is connected via lead 211 to a current feedback circuit 206 whose transfer function is $H(s)$. The current sense signal obtained and processed in this way is then added in the positive feedback manner via lead 203 to a voltage loop processed control signal $\Delta V_{\epsilon 1}(s)$ in a summing circuit 202. The resulting total control signal, obtained by summing in the positive feedback manner the current sense signal processed by the current feedback circuit 206 and the voltage loop processed control signal $\Delta V_{\epsilon 1}(s)$, is applied by lead 204 to PWM control and power stage 205 where it is voltage amplified A times appearing as voltage $\Delta V(s)$ on lead 207 which in actuality is a voltage supplied to the motor and which creates motor current $\Delta I(s)$ through motor equivalent impedance $Z_{ekv}(s)$. As discussed earlier, the electric motor equivalent impedance 208 is a series connection of a resistance $R_{ekv}$ and an inductive reactance $sL_{ekv}$ in case of dc, synchronous ac, and step motors $$Z_{ekv}(s) = R_{ekv} + sL_{ekv} \quad (15)$$

while in case of an induction motor the equivalent impedance is a series connection of a stator impedance $(R_{st}+sL_{st})$ and an impedance obtained as a parallel connection of a magnetizing reactance $sL_m$ and a rotor impedance referred to stator $(R_{rs}+sL_{rs})$ $$Z_{ekv}(s) = (R_{st}+sL_{st}) + sL_m \| (R_{rs}+sL_{rs}) \quad (16)$$

The transadmittance of the zero-impedance converter of FIG. 2, $Y(s)$, is, for $R << |Z_{ekv}(s)|$ and including effects of a back emf $(K_m\Delta\omega_o(s),$ not shown in FIG. 2).

$$\Delta I(s)/\Delta V_{\epsilon 1}(s) = Y(s) = A/\{Z_{ekv}(s)+K_m(1/sJ)G_M(s)-H(s)RAK\} \quad (17)$$

The transfer function of the system of FIG. 2, assuming the velocity reference voltage $\Delta V_R(s)$ at terminal 213 is obtained differentiating the position command $\Delta\theta_i(s)$ from terminal 231, i.e., $\Delta V_R(s) = s\Delta\theta_i(s)$, is $$\Delta\theta_o(s)/\Delta\theta_i(s) = \{G_M(s)G'_R(s)A[K''_p+s]\}/\{[G_M(s)G'_R(s)A(K'_pK''_p+sK_v)]+s^2J[Z_{ekv}(s)-RAKH(s)]\} \quad (18)$$

The dynamic stiffness of the system of FIG. 2, for $R<<|Z_{ekv}(s)|$, is $$\Delta T_L(s)/\Delta\theta_o(s) = S_{dc}(s) = \{[G_M(s)G'_R(s)[K'_pK''_p+sK_v]]+[s^2J/Y'(s)]\}/\{1/Y'(s)\} \quad (19)$$

where $Y'(s) = A/\{Z_{ekv}(s)-H(s)RAK\}$ (19a)

is a part of transadmittance of Eq.(17) in series with the remaining part equal to $Y''(s) = A/\{K_m(1/sJ)G_M(s)\}$. From Eqs.(19) and (19a) it is seen that system becomes load independent for transfer function $H(s)$ given in Eq.(2) and here $$H(s) = Z_{ekv}(s)/RAK \quad (20)$$

Besides providing an infinite transadmittance part, $Y'(s)$, in the converter of FIG. 2, Eq.(20) yields, upon substitution into Eq.(18), for the transfer function of the system of FIG. 2 a denominator which is reduced in its order and which also becomes independent of the system moment of inertia J. The reduced order of denominator of the system transfer function means that system dynamics is reduced with correspondingly improved response to the input command. The denominator of the closed loop transfer function in Eq.(18) for the zero-impedance algorithm of Eq.(20) becomes $[G_M(s)G'_R(s)A(K'_pK''_p+sK_v)]$. It can be shown that, including effects of a, for a constant air-gap flux, opposes voltage applied to any motor $\Delta V(s)$ by an emf proportional to angular speed $K_m\Delta\omega_o(s)$, $K_m$ being a back emf constant, the denominator in Eq.(18) for algorithm of Eq.(20) is $\{G_M(s)[G'_R(s)A(K'_pK''_p+sK_v)+sK_m]\}$.

Also, it is next shown that the algorithm of the zero-impedance converter, as given in Eq.(20), produces for a transfer function $\Delta\omega_o(s)/\Delta V_{\epsilon 1}(s)$ a real number. Including the effects of a back emf, characterized by a constant $K_m$, (not illustrated in FIG. 2), it can be shown that, for the system of FIG. 2

$$\Delta\omega_o(s)/\Delta V_{\epsilon 1}(s) = A/D(s) \quad (21)$$

where $$D(s) = \{Z_{ekv}(s)sJ+K_mG_M(s))(Z_{ekv}(s)-H(s)RAK)]/[-G_M(s)Z_{ekv}(s)]+[H(s)RAKK_m]/[Z_{ekv}(s)]\} \quad (22)$$

The denominator $D(s)$ in Eq.(22) for the algorithm of Eq.(20) becomes $D(s) = K_m$ which, substituted in Eq.(21), yields a real number $$\Delta\omega_o(s)/\Delta V_{\epsilon 1}(s) = A/K_m \quad (23)$$

From Eq.(23) it is seen that the zero-impedance converter 299 in FIG. 2 actually eliminated all time constants associated with the motor impedance $Z_{ekv}(s)$ as well as it eliminated any dependence in the loop of the torque producing mechanisms, denoted by $G_M(s)$, and of the system moment of inertia J. By eliminating all time constants all phase lags due to the time constants are eliminated too, so that the only phase shift contributed in the velocity loop is that of a stabilizing and control block 214, whose transfer function is $G'_R(s)$, which is under our control. The phase shift due to the block 214 and the 180° phase shift due to the negative feedback are the only phase shifts in the velocity feedback loop. In the position feedback loop the phase shift is increased by an additional 90° due to the integration process in block 227 but this still is completely controllable situation. The block 214 can thus be used to provide any desired phase/gain margin.

The zero-impedance converter provides in series with finite transadmittance $Y'''(s)$ the infinite transadmittance $Y'(s)$, for the algorithm of Eq.(20), which eliminates all phase shifts due to the object under the control (in FIG. 2, it is an electric motor) by cancelling all time constants associated with the electric motor. The series connection of the transmittance $Y'(s)$ and $Y''(s)$ becomes equal to transadmittance $Y'''(s)$ for transadmittance $Y'(s)$ becoming infinite. The finite value of the transadmittance $Y'''(s)$ thus provides for the finite and limited value of the motor current $\Delta I(s)$, i.e., for a finite total transadmittance of the zero-impedance converter, given in Eq.(17), so that a finite loop gain is provided in the preferred embodiment in FIG. 2, as derived next. The loop gain around the velocity loop for the embodiment of FIG. 2, and for the algorithm of Eq.(20), is $$LG_v(s) = K_v(A/K_m)G'_R(s) \qquad (24)$$

The loop gain around the position loop in FIG. 2, for Eq.(20), is, for $K_v \neq 0$, $$LG_p(s) = K'_p K''_p A G'_R(s)/\{[K_m + K_v G'_R(s)A]s\} \qquad (25)$$

With reference to FIG. 2, Eqs.(23), (24), and (25) imply that the impedance $Z_{ekv}(s)$ of an electric motor has been forced to zero in that the circuit effects due to the pressence of the impedance $Z_{ekv}(s)$ have been nulled out by the action of the positive current feedback loop. In this action, the positive current feedback provided a negative impedance term, $-H(s)RAK$, which cancelled out the motor impedance $Z_{ekv}(s)$ so that, in a strict sense of the word, the zero-impedance converter is in its actuality a zero-transimpedance converter where the transimpedance $[Z_{ekv}(s) - H(s)RAK]$ is brought to zero. Eqs.(23), (24), and (25) also imply that, in addition to the load independence, the zero-impedance converter provides as well an independence to the mechanical parameters variations, such as system moment of inertia J and viscous friction coefficient variations, implying an infinite robustness with respect to the mechanical parameters. Also, an independence to a mechanisms characterizing torque production in electric motors is provided, these mechanisms denoted by block 220 of transfer function $G_M(s)$.

The algorithm of the zero-impedance converter is also independent on a stabilizing and control block 214, whose transfer function is $G'_R(s)$, as seen from Eq.(20).

The infinite transadmittance part of the zero-impedance converter should be interpreted as a zero transimpedance part of the converter and, with reference to FIG. 2, as forcing the input voltage change to the converter $\Delta V_{\epsilon 1}(s)$ to zero while maintaining a finite current change $\Delta I(s)$ through the impedance of interest $Z_{ekv}(s)$, which is nulled out by the negative impedance term $-H(s)RAK$. Since the input voltage to the zero-impedance converter $\Delta V_{\epsilon 1}(s)$ is in actuality an error voltage obtained through the action of the external negative feedback loops, it follows that by forcing this voltage to zero the corresponding errors produced by these loops (velocity and position errors) are forced to zero in case in which these errors are due to a finite impedance $Z_{ekv}(s)$ It turns out, as seen from Eq.(19), that these errors are due to a finite impedance $Z_{ekv}(s)$ when load torque, acting on the drive system, changes. Therefore, zero-impedance converter, with its property of infinite transadmittance portion, i.e., with its ability to force the impedance of interest $Z_{ekv}(s)$ to zero, forces zero errors in both position and velocity loops of a drive system for case of load changes, yielding the load independence of angular position and angular velocity of the motor shaft in both transient and steady state. By reducing the resistive part of the motor impedance $Z_{ekv}(s)$ to zero the steady state error in the angular position and velocity, when load changes, is zero. By reducing the inductive part of the motor impedance to zero the transient error in the angular position and velocity, when load changes, is zero. Physically, by cancelling all (electrical and mechanical) time constants associated with an electric motor and by cancelling a voltage drops across the resistive parts of a motor impedance, the zero-impedance converter provides for the load invariance in transient and steady state, respectively. The zero-impedance converter thus provides for instantaneously supplied motor current $\Delta I(s)$ as per load torque demand, i.e., the current necessary to instantaneously provide $\Delta T_M(s) = \Delta T_l(s)$ in FIG. 2, which, effectively, is providing an instantaneous current change through an inductance and this action is limited only by the physical properties of a physical system such as finite energy level of available sources, finite power dissipation capability of available components and finite speed of transition of control signals.

Since the electric motor drive systems are in general a control systems which are designed to follow an input position or velocity command, it follows that by eliminating the load dependency using the zero-impedance converter the design of the negative feedback position and velocity loops can be simplified, as seen from Eqs.(23), (24), and (25). These Equations have been derived for the embodiment of FIG. 2 incorporating the zero-impedance converter 299, and they are valid for either when load does not change, i.e., $\Delta T_l(s) = 0$, or when load does change, i.e., $\Delta T_l(s) \neq 0$, because the zero-impedance converter provides for the load independence of the output variables of interest, i.e., $\Delta \theta_o(s)/\Delta T_l(s) = 0$ and $\Delta \omega_o(s)/\Delta T_l(s) = 0$. As seen from Eqs.(24) and (25), the design of the negative feedback velocity and position loop reduces to using block 214 of transfer function $G'_R(s)$ appropriately designed to provide any desired phase/gain margin with the corresponding responses of the output variables under the control, velocity $\Delta \omega_o(s)$ and position $\Delta \theta_o(s)$, to the changes of the input commands $\Delta V_R(s)$ and $\Delta \theta_i(s)$, respectively. These responses are already improved due to the reduced order of denominator of closed loop transfer function of Eq.(18) caused by incorporating the zero-impedance converter, as discussed earlier, and their further improvement is easily done by appropriately choosing $G'_R(s)$.

In connection with a sensitivity analysis, which also has been preformed for the preferred embodiment of FIG. 2 showing quite acceptable figures in terms of how the changes of the parameters involved in the algorithm of Eq.(20) affect the performance of the zero-impedance converter, it can be shown that a change in the impedance of interest or, equivalently, a change in the transfer function in the algorithm of this second embodiment, given by Eq.(20), such that impedance $Z_{ekv}(s)$ becomes $Z_{ekv}(s) + \Delta Z_{ekv}(s)$, or that the nominator of the transfer function of Eq.(20) $Z_{ekv}(s)$ becomes $Z_{ekv}(s) + + \Delta Z_{ekv}(s)$, would result in a changed transadmittance of the zero-impedance converter so that Eq.(17) would become $\Delta I(s)/\Delta V_{e1}(s) = A/\{Z''(s) + \Delta Z_{ekv}(s)\}$ or $\Delta I(s)/\Delta V_{e1}(s) = -A/\{Z''(s) + \Delta Z_{ekv}(s)\}$, respectively, where $Z''(s) = K_m(1/sJ)G_M(s)$.

With regards to a circuit realization of the block 206 in the positive current feedback loop, it is seen from Eqs.(15) and (20) that this block is realized by implementing a differentiator circuit with a dc path in case of dc, synchronous ac, and step motors, while in case of asynchronous ac (induction) motors the circuit realization of block 206 is done in accordance with Eqs.(16) and (20). Therefore, the circuit realization of block 206 is simple and exactly determined by Eqs.(15), (16), and (20). Alternatively, a software implementation, based on implementing Eqs.(15), (16), and (20), can be done in order to realize block of transfer function H(s). A possible circuit implementations in an analog form of block 206 of FIG. 2, as well as of block 106 of FIG. 1, have been given in the two copending and coassigned application Ser. Nos. 07/323,630 and 07/316,664 with respect to dc and ac drives, respectively, and in the U.S. Pat. No. 4,885,674 respect to power converters. This application presents a generalization of the subject matter discussed in the previous applications/patent as well as it extends itself in applying the zero-impedance converter to synthesizing load independent step motor drive systems and also in improving a transfer function of the zero-impedance converter applied in synthesizing load independent switch-mode power converters.

Various changes and modifications may be made, and features described in connection with any one of the embodiments may be used with any of the others within the scope of the inventive concept.

For example, the applications of a zero-impedance converter to a capacitive impedance may be performed without departing from the scope of the inventive concept. In such a case, the zero-impedance converter would, in accordance with its properties described in this application, provide for an instantaneous change of voltage across a capacitive impedance. The implementation of the current feedback circuit of transfer function H(s) would call for an integration (rather than a differentiation called for in cases of inductive impedances) with a dc path (if the capacitive impedance contains a resistance in series).

Also, the applications of the zero-impedance converter in case of inductive impedances are not limited to those described in this application (switch-mode power converters, dc motors, ac synchronous and asynchronous motors, and step motors) but are rather possible in all cases in which the properties of the zero-impedance converter, described in this application, are needed.

We claim:

1. A method for synthesizing zero-impedance converter comprising:
   accepting a source of electrical energy of a constant voltage or a feedforward compensated voltage at an input,
   coupling through an output filter to a load to be energized at an output,
   controlling a power flow from said input to said output,
   modulating a power converter for the control of said power flow in a pulse width modulation manner,
   supplying a resulting control voltage for modulating said power converter,
   sampling a voltage across said load,
   sensing a current through an output filter inductor,
   feeding back the sampled voltage signal in a negative feedback loop with respect to a reference voltage and summing the two voltages,
   passing a signal obtained as the algebraic sum of the sampled voltage and said reference voltage through a stabilizing network; thereby producing a voltage loop processed error signal proportional to a difference between the two voltages,
   feeding back the sensed current signal through a current feedback circuit in a positive feedback loop with respect to said voltage loop processed error signal and summing the two signals,
   supplying said resulting control voltage, obtained as the sum of said voltage loop processed error signal and the current signal fed through said current feedback circuit, for modulating said power converter for the control of the flow of power from the input source to the output load, whereby impedance of said output filter inductor is being forced to zero making said voltage across said load independent of said load and of variations of a parallel output filter capacitor and making a transfer function of the zero-impedance converter independent of a parameters of said output filter and said load.

2. The method of claim 1 wherein said source of electrical energy is being of said constant voltage or being of said feedforward compensated voltage adjusting a slope of a rising edge of a sawtooth waveform inherent in said pulse width modulation manner, whereby said slope is made in a direct proportion to the input voltage.

3. The method of claim 2 wherein said current feedback circuit in said positive feedback loop is synthesized using an equation providing transfer function in laplace domain of said current feedback circuit $$H(s) = Z'_{ekv}(s)/RAK$$

in said equation $Z'_{ekv}(s)$ being an impedance of said output filter inductor, R being a transresistance of an inductor current sense device, A being a voltage gain of a pulse width modulation control and power stage, K being a voltage gain of a buffering amplifier, and s being a complex frequency laplace variable in the transfer function H(s).

4. The method of claim 3 wherein said equation providing transfer function of said current feedback circuit is physically implemented, thereby implementing said current feedback circuit, in accordance with an expression giving said impedance of said output filter inductor in laplace domain $$Z'_{ekv}(s) = R_w + sL_o$$

in said expression $R_w$ being a wire resistance of said output filter inductor, $L_o$ being an inductance of said output filter inductor, and s being a complex frequency variable in said expression.

5. A method for synthesizing zero-impedance converter comprising:
accepting a source of electrical energy of a constant voltage at an input,
coupling mechanically a shaft of an electric motor, including a direct current, an alternating current synchronous and asynchronous, and a step motor, to a load to be driven at an output,
controlling a power flow from said input to said output,
modulating a power converter for the control of said power flow in a pulse width modulation manner,
supplying a total control signal for modulating said power converter, supplying a position feedback pulses,
feeding back said position feedback pulses in a negative feedback loop with respect to a position command pulses and comparing frequency and phase of the two pulse trains in a phase frequency detector; thereby producing a position error signal proportional to a difference in frequency and phase between the two pulse trains,
supplying a velocity feedback signal,
feeding back said velocity feedback signal in a negative feedback loop with respect to a velocity reference voltage and said position error signal and summing the three voltages,
passing a signal obtained as the algebraic sum of said velocity feedback signal and said velocity reference voltage and said position error signal through a stabilizing and control block; thereby producing a control signal proportional to the algebraic sum of said velocity reference voltage and said velocity feedback signal and said position error signal,
sensing a current through said electric motor, including said direct current, or said alternating current synchronous or asynchronous, or said step motor,
feeding back the sensed current signal through a current feedback circuit in a positive feedback loop with respect to said control signal and summing the two signals,
supplying said total control signal, obtained as the sum of said control signal and the current signal fed through said current feedback circuit, for modulating said power converter for the control of the flow of power from the input electrical source to the output mechanical load, whereby impedance of said electric motor, including impedance of said direct current motor, or impedance of said alternating current synchronous or asynchronous motor, or impedance of said step motor, is being forced to zero making an angular shaft speed and position independent of said load and making a transfer function from said control signal, applied to the zero impedance converter, to said angular shaft speed and position a constant independent of a time constants of said electric motor and of a mechanisms of producing torque of said electric motor and of a mechanical parameters of said electric motor and said load.

6. The method of claim 5 wherein said current feedback circuit in said positive feedback loop is synthesized using an equation providing transfer function in laplace domain of said current feedback circuit $$H(s) = Z_{ekv}(s)/RAK$$

in said equation $Z_{ekv}(s)$ being an impedance of said electric motor, including impedance of said direct current motor, or impedance of said alternating current synchronous or asynchronous motor, or impedance of said step motor, R being a transresistance of a motor current sense device, A being a voltage gain of a pulse width modulation control and power stage, K being a voltage gain of a buffering differential amplifier, and s being a complex frequency laplace variable in the transfer function $H(s)$.

7. The method of claim 6 wherein said equation providing transfer function of said current feedback circuit is physically implemented, thereby implementing said current feedback circuit, in case of the direct current motors, or the alternating current synchronous motors, or the step motors, in accordance with an expression giving said impedance of said electric motor in laplace domain $Z_{ekv}(s)$ as a series connection of a resistance and an inductive reactance of said electric motor, and, in case of the alternating current asynchronous motors, in accordance with another expression giving said impedance of said electric motor in laplace domain $Z_{ekv}(s)$ as a series connection of a stator impedance with parallel connection of a magnetizing reactance and a rotor impedance referred to stator of said electric motor.

* * * * *